April 7, 1942.  F. S. MARTIN  2,278,551
METHOD OF MAKING BALL CENTERS AND ARTICLE
Filed Feb. 6, 1941
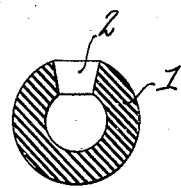
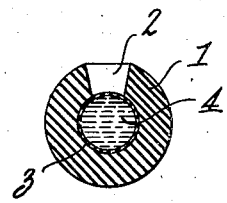
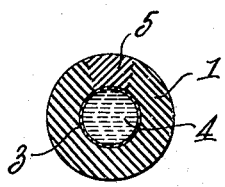
INVENTOR.
FRANK S. MARTIN
BY Lester G. Budlong
ATTORNEY Patented Apr. 7, 1942

2,278,551

UNITED STATES PATENT OFFICE 2,278,551

METHOD OF MAKING BALL CENTERS AND ARTICLE

Frank S. Martin, Providence, R. I., assignor to United States Rubber Company, New York, N. Y., a corporation of New Jersey Application February 6, 1941, Serial No. 377,648

7 Claims. (Cl. 154—18)

This invention relates to a method of making ball centers and to the article, and more particularly to the making of golf ball centers.

The better grades of modern golf balls are generally made with a tense winding of rubber thread over a liquid or paste filled winding center. Various methods are in use for making the liquid or paste filled center. In one two hemi-spherical halves are molded of rubber, and the two halves then cemented together, and the liquid or pasty filling may be either introduced by a hypodermic needle after the halves have been united, or it may be disposed between them in a thin gelatine or rubber sac before the halves are united. In still another method a solid pill may be provided of a material which is easily liquefiable and which will remain liquid at ordinary temperatures, and this pill may be disposed between two pieces of sheet rubber stock which are cut-seamed together to form a cover for the pill. Alternately, instead of using a pill of solid material a thin walled sac of gelatine or rubber filled with liquid may be used and covered by the cut-seaming operation. In still another method a thin sac with a filling neck is made from rubber by the dipping method, and after filling the sac with liquid or paste the neck is tied off with a rubber thread and the excess portion of the neck cut off.

All of the above described methods have one or more disadvantages. Where the fluid container is made of two halves which are afterwards cemented together trouble has been had in leakage of the liquid, and due to the extended seam at the point of connection the bond is often insufficient. Where two slabs of stock are cut-seamed together to form the container there is also difficulty sometimes in leakage and it is difficult to make the container with walls of uniform thickness, so that the liquid filling is not truly spherical or not accurately centered. In the case of the thin rubber sac with a filling neck the projecting portion and rubber thread used to tie it act to unbalance the center, and as they are pushed inwardly when the center is wrapped the liquid filling in this case also is not truly spherical.

An object of the present invention is to provide an economical method of making a ball center with a uniform wall thickness and with the liquid filler cavity centrally disposed and truly spherical.

Another object is to provide a center which can easily be filled and closed, and which is not liable to leak.

Other objects will appear from the detailed description and drawing, in which latter Figure 1 is a cross section through a molded empty container for the liquid filler;

Figure 2 is a similar section with the liquid filler in place; and

Figure 3 is a similar section with the filler opening closed.

Referring to the drawing, the numeral 1 designates a hollow spherical container which may be made of rubber by molding and semi-curing. By molding the outer surface can be made truly spherical and the inner cavity will also be truly spherical and centered in the container. At 2 there is shown a filler opening which may be of any suitable shape, but is preferably circular in cross section and inwardly tapering. The opening may be of suitable size, but preferably not too large, and at its inner end its diameter should be less than the diameter of the spherical cavity in the container.

To fill the container the opening 2 is temporarily expanded by any suitable tool, and in the form shown the liquid filling is introduced as a unit, and may be a thin-walled jacket 3 of gelatine, rubber, or other flexible material containing the liquid filler 4. The filled jacket 3 is of a size completely filling the spherical cavity in the container 1. Instead of using a liquid filled jacket there may be introduced into the cavity a pellet of solid material which is easily liquefiable and which will remain liquid at ordinary temperatures. After the introduction of the filling material the expanding tool may be withdrawn and the container allowed to contract again, after which a plug 5 of rubber, which may be either raw or semi-cured, is fitted into the opening 2, and if desired a rubber cement may be used to unite the parts. The entire assembly is then completely vulcanized in a mold.

While in the above described embodiment of the invention the container has been referred to as of rubber, it is obvious that any other suitable pliable and elastic material may be used such as chloroprene, or any of the more recently developed elastomers.

It will be seen that by the invention a ball center has been provided in which the inner and outer surfaces are truly spherical, so that the liquid filling will be truly spherical and accurately centered in its container, and in which the filler opening is relatively small so that it can be accurately plugged, and the area of union between the plug and the remainder of the container is also small, while the material of the plug and the container are integrally united at such point of union by vulcanization, so that danger of leakage of the liquid filling is reduced to a minimum.

Having thus described my invention, what I claim and desire to protect by Letters Patent is:

1. The method of making a ball center which comprises forming a hollow sphere of elastic material with an inwardly tapering opening of less diameter at its inner end than the sphere interior cavity, inserting through said opening a fluid filled flexible container to fill the cavity, and inserting in said opening a plug of elastic material and uniting the same with the body of the sphere.

2. The method of making a ball center which comprises forming a hollow sphere of elastic material with an inwardly tapering opening of less diameter at its inner end than the sphere interior cavity, temporarily stretching the material to enlarge said opening and inserting therethrough as a unit material for forming a fluid filler, and relaxing said elastic material and closing the opening with a plug of elastic material that conforms to the taper of said opening.

3. The method of making a ball center which comprises molding and semi-curing a hollow sphere of rubber with an opening therein of less diameter than the sphere interior cavity, temporarily expanding said opening and inserting therethrough a thin-walled, flexible, fluid-filled container of a size to fill said cavity, plugging said opening with rubber, and vulcanizing the assembly.

4. The method of making a ball center which comprises molding and semi-curing a hollow sphere of rubber with an opening of less diameter than the sphere interior cavity, inserting through said opening a filling of readily liquefiable solid material, plugging said opening with rubber, and vulcanizing the assembly.

5. The method of making a ball center which comprises molding and semi-curing a hollow sphere of rubber with an inwardly tapering opening of less diameter at its inner end than the sphere interior cavity, temporarily expanding said opening and inserting therethrough a spherical pill of readily liquefiable solid material to fill said cavity, plugging said opening with rubber, and vulcanizing the assembly.

6. A ball center substantially identical with a center made by the method of claim 1.

7. A golf ball center having a centrally located and spherical liquid filling and substantially identical with a center made by the process of claim 3.

FRANK S. MARTIN.